(12) United States Patent
Zarenin (10) Patent No.: US 7,784,064 B2
(45) Date of Patent: *Aug. 24, 2010

(54) METHOD FOR COLLECTING MONITOR INFORMATION

(75) Inventor: Alex Zarenin, Montclair, NJ (US)

(73) Assignee: Barclays Capital Inc., New York, NY (US)

( * ) Notice: Subject to any disclaimer, the term of this patent is extended or adjusted under 35 U.S.C. 154(b) by 1761 days.

This patent is subject to a terminal disclaimer.

(21) Appl. No.: 10/834,336

(22) Filed: Apr. 28, 2004

(65) Prior Publication Data

US 2005/0235071 A1  Oct. 20, 2005

Related U.S. Application Data

(60) Provisional application No. 60/562,068, filed on Apr. 14, 2004.

(51) Int. Cl.
*G06F 3/00* (2006.01)

(52) U.S. Cl. ........................ 719/327; 710/15

(58) Field of Classification Search ................ 719/310, 719/327; 717/127; 710/15
See application file for complete search history.

(56) References Cited

U.S. PATENT DOCUMENTS 6,721,941 B1 *  4/2004  Morshed et al. ............. 717/127
6,754,664 B1 *  6/2004  Bush ........................... 707/102
6,813,670 B1 * 11/2004  Yao et al. .................... 710/302

(Continued)

FOREIGN PATENT DOCUMENTS

| JP | 07-219606 | 8/1995 |
| JP | 2002-232423 | 8/2002 |
| JP | 2003-241724 | 8/2003 |

(Continued)

OTHER PUBLICATIONS

"Windows Management Instrumentation Provider Programming", (White Paper), Microsoft Corporation, 1999, pp. 1-26.

(Continued)

*Primary Examiner*—Lechi Truong
(74) *Attorney, Agent, or Firm*—Morgan, Lewis & Bockius LLP (57) ABSTRACT

A method for collecting information regarding monitors connected to Window-based computer systems. A monitor class definition is established, and a monitor information provider is created. The monitor information provider is loaded on a Windows-based computer, which includes at least one monitor. The monitor information provider gathers serial number and model information of the monitor.

6 Claims, 9 Drawing Sheets

U.S. PATENT DOCUMENTS

| | | | |
|---|---|---|---|
| 6,865,580 B1 * | 3/2005 | Bush | 707/103 Y |
| 7,010,624 B1 * | 3/2006 | Zhou et al. | 710/8 |
| 7,024,476 B1 | 4/2006 | Page et al. | |
| 7,478,153 B2 | 1/2009 | Page et al. | 709/223 |
| 2003/0105732 A1 | 6/2003 | Kagalwala et al. | |
| 2003/0174156 A1 | 9/2003 | Katsuhara et al. | |
| 2003/0229740 A1 | 12/2003 | Maly et al. | |
| 2004/0010781 A1 | 1/2004 | Maly et al. | |
| 2004/0088708 A1 | 5/2004 | Ramanujam et al. | |
| 2004/0107369 A1 | 6/2004 | Cooper et al. | |
| 2004/0107374 A1 | 6/2004 | Cooper et al. | |
| 2004/0107421 A1 | 6/2004 | VoBa et al. | |
| 2004/0128563 A1 | 7/2004 | Kaushik et al. | |
| 2004/0226026 A1 | 11/2004 | Glass et al. | |

FOREIGN PATENT DOCUMENTS

| | | |
|---|---|---|
| WO | WO 00/38048 | 6/2000 |

OTHER PUBLICATIONS

Stemp, Greg, "WMI Helps Those Who Help Themselves", Microsoft Corporation, Feb. 11, 2004, [downloaded from: msdn.microsoft.com/library/en-us/dnclinic/html/scripting02102004.asp], pp. 1-10.

*CIM System Model White Paper*, Jun. 17, 2003, pp. 1-22.

Cole, Gwyn and Craig Tunstall, Developing WMI Solutions: A Guide to Windows Management Instrumentation, Pearson Education, Inc., published Nov. 12, 2002, Chapters 10-12.

* cited by examiner

```
//*********************************************
// WBEM Property Provider Interface Definition
// Imported from WbemProv.idl
//*********************************************
    [
    object,
    uuid(CE61E841-65BC-11d0-B6BD-00AA003240C7)
    ]
interface IWbemPropertyProvider : IUnknown
    {
    HRESULT GetProperty(
        [in] long lFlags,
        [in] const BSTR strLocale,
        [in] const BSTR strClassMapping,
        [in] const BSTR strInstMapping,
        [in] const BSTR strPropMapping,
        [out] VARIANT* pvValue
        );

HRESULT PutProperty(
        [in] long lFlags,
        [in] const BSTR strLocale,
        [in] const BSTR strClassMapping,
        [in] const BSTR strInstMapping,
        [in] const BSTR strPropMapping,
        [in] const VARIANT* pvValue
        );
    };
```

FIG. 3

```
//*******************************************
// WBEM Property Provider Initialization
// Interface Definition.
// Imported from WbemProv.idl
//*******************************************
    [
    object,
    uuid(1be41572-91dd-11d1-aeb2-00c04fb68820)
    ]
interface IWbemProviderInit : IUnknown
    {
    HRESULT Initialize(
        [in, unique, string] LPWSTR wszUser,
        [in] LONG lFlags,
        [in, string] LPWSTR wszNamespace,
        [in, unique, string] LPWSTR wszLocale,
        [in] IWbemServices* pNamespace,
        [in] IWbemContext* pCtx,
        [in] IWbemProviderInitSink* pInitSink
        );
    };
```

FIG. 4

```
//*******************************************
// Base Class Interface Definition
//*******************************************
    [
    object,
    uuid(58132431-8E41-4E95-94E3-E51ECF0BB911),
    dual,
    helpstring("IWPPMI Interface"),
    pointer_default(unique)
    ]
interface IWPPMI : IDispatch
    {
    };
```

FIG. 5

```
//*******************************************
// WPPMI Class Definition
//*******************************************
    [
    uuid(E6E084BE-38BB-4E55-9AA0-1783C7211FAC),
    helpstring("WPPMI Class")
    ]
coclass WPPMI
    {
                interface IWPPMI;
    [default]   interface IWbemPropertyProvider;
                interface IWbemProviderInit;
    };
```

```
00 FF FF FF FF FF FF 00 38 A3 C0 65 01 01 01 01 18 0B    .ÿÿÿÿÿÿ.8£Àe......
01 03 80 24 1D 78 EA 2F 3F 9C 58 4C 98 25 18 4C 50 BF    ...$.xê/?œXL.%.LP¿
EF 80 71 4F 81 40 81 4F 31 59 45 59 61 59 01 01 01 01    ï.qO.@.OlYEYaY....
30 2A 00 98 51 00 2A 40 30 70 13 00 67 1F 11 00 00 1E    0*..Q.*@0p..g.....
00 00 00 FD 00 32 55 1F 52 0E 00 0A 20 20 20 20 20 20    ...ý.2U.R...
00 00 00 FC 00 4E 45 43 20 4C 43 44 31 38 35 30 58 0A    ...ü.NEC LCD1850X.
00 00 00 FF 00 31 36 30 30 34 32 37 43 41 0A 20 20 20    ...ÿ.1600427CA.
```

```
#pragma namespace ("\\\\.\\root\\CIMV2")

instance of __Win32Provider as $WPPMI
{
    Name = "MIPP";
    ClsId = "{E6E084BE-38BB-4E55-9AA0-1783C7211FAC}";
};

instance of __PropertyProviderRegistration
{
    Provider = $WPPMI;
    SupportsPut = FALSE;
    SupportsGet = TRUE;
};

#pragma deleteclass("MonitorInformation", NOFAIL)
class MonitorInformation
{
    [KEY]   STRING      InstKey;
            uint32      Index;
            STRING      Model;
            STRING      SerialNumber;
};

//-- First PnP-capable monitor on PnP OS (W2K, XP)
[DYNPROPS,ClassContext("Monitor"),InstanceContext("1")]
instance of MonitorInformation
{
    InstKey = "1";
    Index   = 1;
    [PropertyContext("Model"), DYNAMIC, Provider("MIPP")]         Model;
    [PropertyContext("SerialNumber"), DYNAMIC, Provider("MIPP")]  SerialNumber;
};

//-- Second PnP-capable monitor on PnP OS (W2K, XP)
[DYNPROPS,ClassContext("Monitor"),InstanceContext("2")]
instance of MonitorInformation
{
    InstKey = "2";
    Index   = 2;
    [PropertyContext("Model"), DYNAMIC, Provider("MIPP")]         Model;
    [PropertyContext("SerialNumber"), DYNAMIC, Provider("MIPP")]  SerialNumber;
};
```

FIG. 9

METHOD FOR COLLECTING MONITOR INFORMATION

CROSS REFERENCE TO RELATED APPLICATIONS

The present application claims priority to U.S. Provisional Patent Application No. 60/562,068, filed Apr. 14, 2004, entitled "Method for Collecting Monitor Information", the contents of which is hereby incorporated herein in its entirety by reference.

BACKGROUND OF THE INVENTION

1. Field of the Invention

The present invention relates to managing enterprise systems, applications, and networks.

2. Background of the invention

One of the greatest challenges facing information technology managers is managing enterprise systems, applications, and networks as they become larger and more complex. In order to help solve these problems and reduce the total cost of ownership (TCO) of Windows-based servers and desktops, Microsoft has developed Windows Management Instrumentation (WMI), a scalable management infrastructure, and included it as part of the Windows Operating System.

WMI is the Microsoft implementation of Web-Based Enterprise Management (WBEM)—an industry initiative to develop a standard technology for accessing management information in an enterprise environment. The WBEM initiative results from the cooperative efforts of Microsoft, BMC Software, Cisco Systems, Compaq Computer, and Intel, as well as many other member companies active in the Distributed Management Task Force (DMTF). To represent systems, applications, networks, devices, and other managed components adopted by the DMTF, WMI uses the Common Information Model (CIM) defined by DMTF. WMI includes the managed objects defined by CIM as well as extensions to the CIM model for additional information available from the Windows platform.

The WMI architecture consists of the management infrastructure and WMI providers. A management infrastructure includes the CIM Object Manager (CIMOM) and a central storage area for management data called the CIMOM Object Repository. The CIMOM provides applications with uniform access to management data. WMI providers function as intermediaries between CIMOM and managed objects. CIMOM hides the capabilities of specific providers from WMI-based management applications, presenting a uniform set of capabilities (data retrieval and update, query, method execution, and events) through a single API irrespective of the capabilities of the underlying provider.

This layered architecture provides for seamless expansion of the WMI framework by allowing more providers to be added into this architecture as needed. The need for new providers arises when new managed resources are introduced into the computing environment. Lately, computer monitors have become one of those new resources.

With the sharp drop in prices for host systems and advances in monitor technologies, such as large-screen LCD panels and plasma screens, monitors started to carry a larger portion of the cost of a typical computer system. Moreover, advances in Operating System and graphical cards now allow for the connection of multiple monitors to the system (up to 8 or even more in some instances). Thus, monitors have become one of the crucial resources that need to be tracked and managed on the corporate network.

SUMMARY OF THE INVENTION

The present invention is directed to a method for collecting information regarding monitors connected to Window-based computer systems. A monitor class definition is established, and a monitor information provider is created. The monitor information provider is loaded on a Windows-based computer, which includes at least one monitor. The monitor information provider gathers serial number and model information of the monitor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Modern monitors (those that support "Plug-and-Play" specification) are capable of reporting model and serial numbers to the host system. This information is crucial for managing monitor resources and tracking their migration through the corporation. The original CIM model and standard set of WMI providers do not account for this profound change in the computing environment and do not provide features to retrieve model/serial number information from attached monitors. Thus, there is a need to extend WMI by adding a monitor object to the CIM schema and developing a corresponding provider.

To meet this need, the present invention provides a programmatic implementation of the custom WMI property provider, exposing essential monitor information to the CIMOM.

The present invention also provides a Management Object Format (MOF) script, that extends the CIM schema with the monitor information class and associates properties of this class (monitor model and serial number) with the corresponding custom provider.

In accordance with the present invention, a digital computer system (referred to herein as WMI Monitor Information Property Provider (WMI-MIPP)) utilizes MOF, COM, and Win32 API to discover and identify monitor devices attached to the host system. A COM component adhering to the WMI interface specification exposes instance(s) of the WMI MonitorInfo class. This provides, in a standardized and consistent way, details regarding monitors attached to the system. A script in the Managed Object Format (MOF) language which, when compiled, introduces a new class, MonitorInfo, into the WMI namespace and establishes a link between the class and corresponding property provider.

Figure 1:
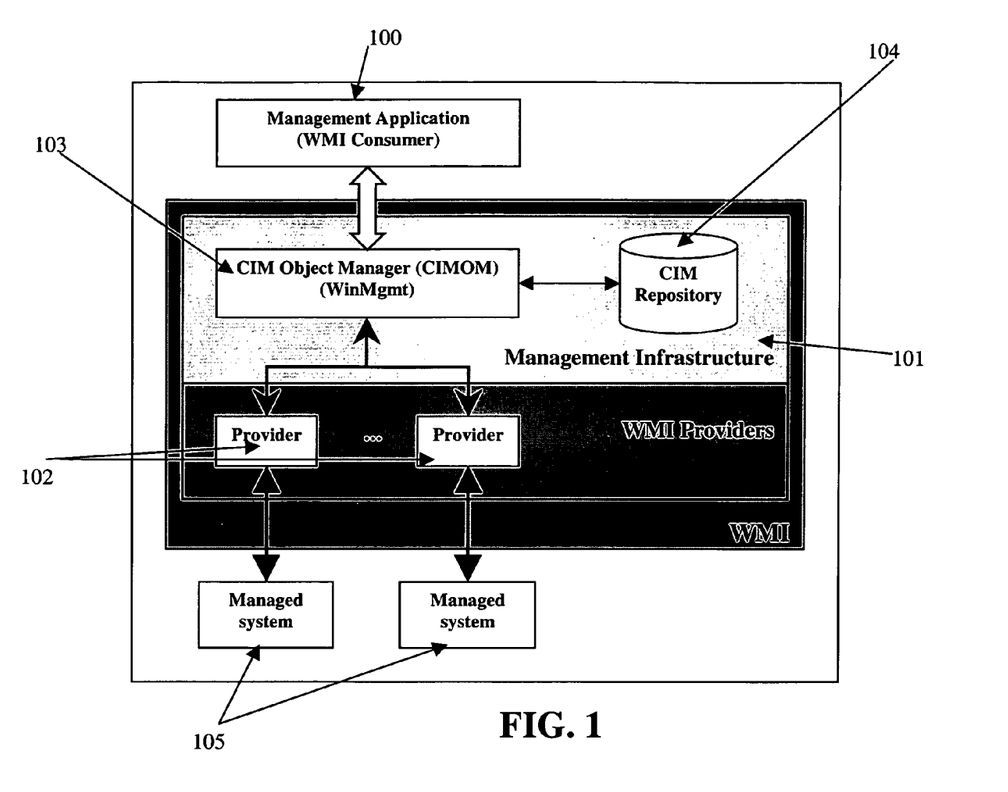
FIG. 1 illustrates an exemplary architecture used in connection with a preferred embodiment of the present invention.

With reference to FIG. 1, the WMI architecture is described. The WMI architecture includes the management infrastructure 101 and WMI providers 102 (such as WMI-MIPP). The management infrastructure 101 includes the CIM Object Manager (CIMOM) 103 and a central storage area for managing data, referred to as the CIMOM object repository 104. The CIMOM 103 provides applications with uniform access to management data. WMI providers 102 function as intermediaries between CIMOM 103 and managed objects 105. Managed object 105 can be a computer system, a hard drive, or a monitor, by way of example; generally, the managed object 105 is an item for which one of the providers 102 is responsible. Using the WMI APIs, defined as a set of WMI-specific COM interfaces, providers 102 supply CIMOM 103 with data from managed objects 105, handle requests on behalf of management applications 100, and generate event notifications.

Communication among the components of the WMI architecture is described as follows. When a request is made from management application 100 for information about, e.g., a class, CIMOM 103 retrieves information about the class from the CIM object repository 104 and the requested information is returned. Based on the information returned, CIMOM 103 determines whether it can obtain information about the class from CIM object repository 104 or whether it must query one of providers 102. If CIMOM 103 needs to query the provider 102, it obtains information about the provider 102 from the CIM object repository 104, namely, what type of provider 102, how should it communicate with the provider 102, and what properties does the provider support.

The WMI specification defines several types of providers that can plug into the management infrastructure 101, such as Class, Instance, and Property providers. Class providers define the corresponding WMI Management Object (Class) in the CIMOM object repository 104 and identify and populate instances of this class. Class providers are mostly self-contained, but, at the same time, are the most rigid providers—once implemented, changes to the corresponding class would require re-coding of the provider. Also, the properties of the instances of the corresponding class can not be used in other classes directly.

Instance providers define the instances of a pre-defined WMI Management Object and populate their properties with the values obtained or pertinent to the instances of the corresponding managed objects. If the object definition changes, the instance provider code must also be changed accordingly.

WMI property providers supply to the management infrastructure only the properties of a certain category of managed objects. These properties should be mapped to instances of some WMI Managed Objects outside and independently of the provider, generally through a MOF script. As long as the exposed properties stay the same, which is generally the case for any physical objects, there is no need to change the property provider—the Managed Object definition may change, and properties may be mapped to the instances of a different class, but the provider will be able to stay the same and provide useful functionality to the management infrastructure.

In accordance with these considerations, the WMI provider of the present invention is developed and coded as a property provider (i.e., WMI-MIPP), which requires the development of a corresponding MOF script that brings the WMI-MIPP into the WMI management framework.

Figure 2:
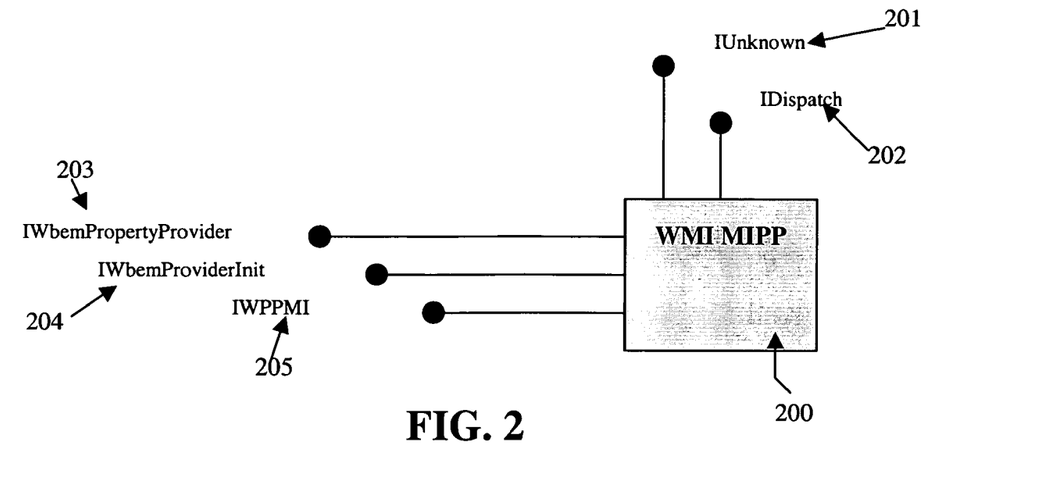
FIG. 2 illustrates a preferred embodiment of the provider object used in connection with a preferred embodiment of the present invention.

FIG. 2 illustrates a COM representation of the monitor information property provider object 200 (one of providers 102 shown in FIG. 1). This object 200 implements two standard COM interfaces (IUknown 201 and IDispatch 202); two interfaces required for WMI property provider interfaces (IWBEMPropertyProvider 203 and IWBEMProviderInit 204); and an empty IWPPMI interface 205. These interfaces are detailed in FIGS. 3, 4 and 5.

Figure 3:
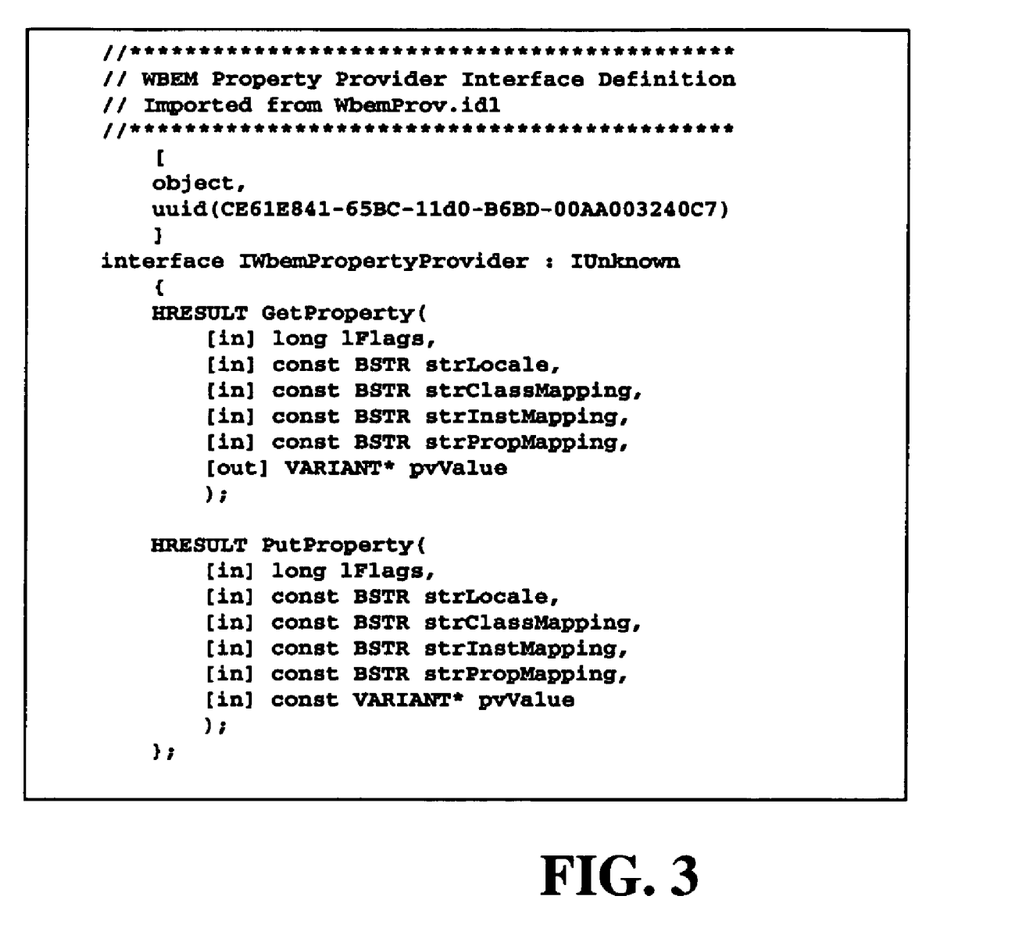
FIG. 3 illustrates an interface definition used in connection with a preferred embodiment of the present invention.

FIG. 3 illustrates a definition of the IWBEMPropertyProvider interface 203, of FIG. 2, in Microsoft Interface Definition Language (MIDL). This interface defines two methods—GetProperty and PutProperty. These methods are invoked by the management infrastructure 101, of FIG. 1, to implement read and write access to the properties exposed by the corresponding property provider (e.g., provider 102 of FIG. 1).

Figure 4:
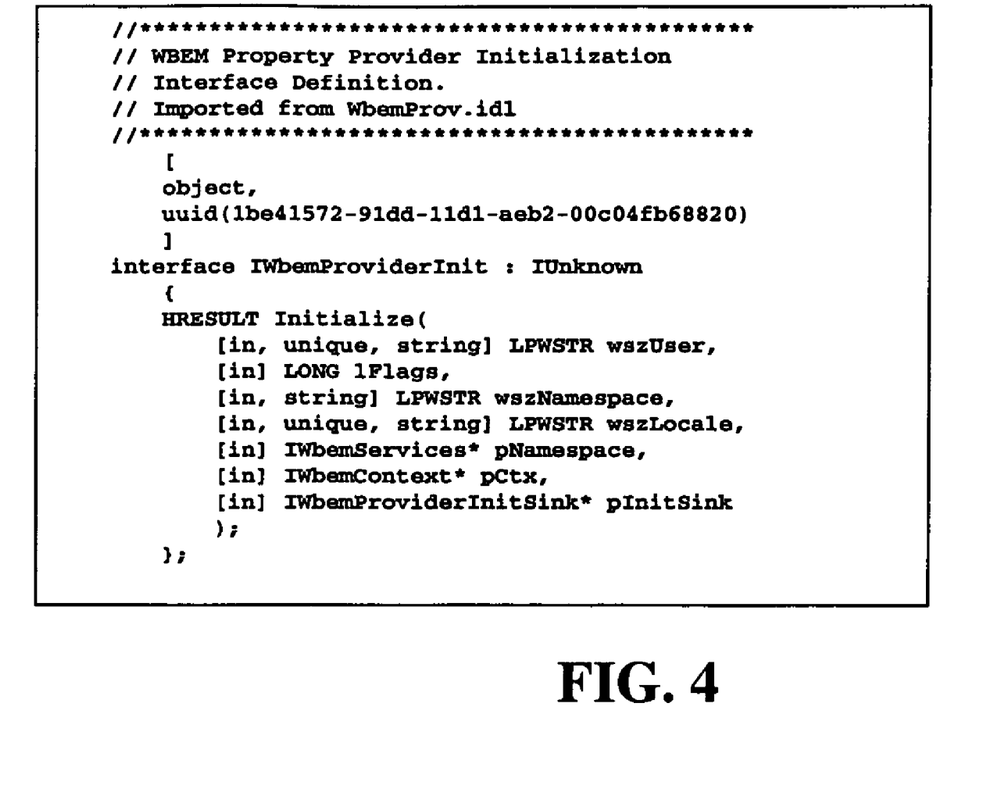
FIG. 4 illustrates an interface definition used in connection with a preferred embodiment of the present invention.

FIG. 4 illustrates an MIDL definition of the IWBEMProviderInit interface 204, of FIG. 2, which is invoked by the management infrastructure 101, of in FIG. 1, when the provider 102 is activated to give the provider 102 a chance to initialize internal data structures and inform the management infrastructure 101 about the operation status of the provider 102.

Figure 5:
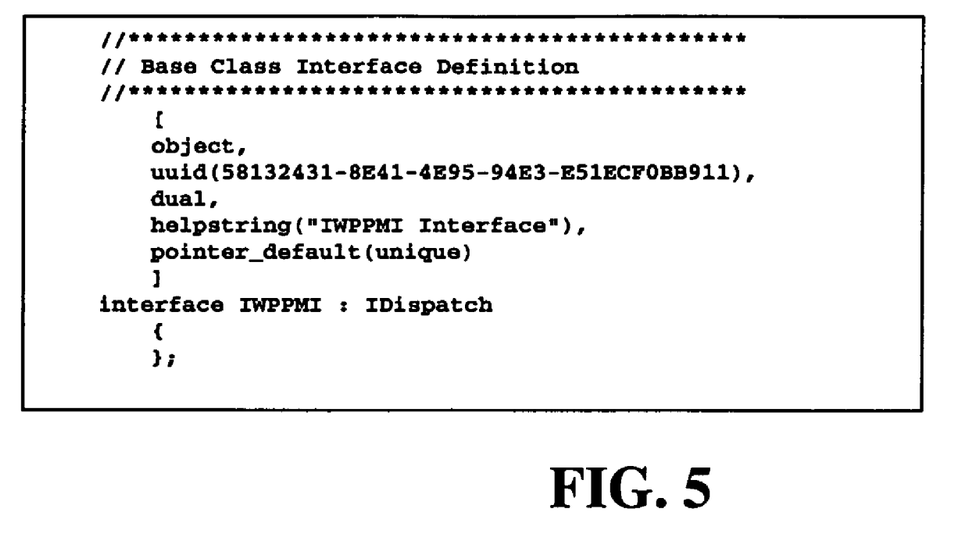
FIG. 5 illustrates an interface definition used in connection with a preferred embodiment of the present invention.

FIG. 5 illustrates an MIDL definition of the IWPPMI interface 205, of FIG. 2. This interface does not have properties, methods, or events defined in it—it is essentially empty, and is used only to bring the IDispatch interface 202 definition (through inheritance) into the implementation of the monitor information COM object 200 of FIG. 2.

Figure 6:
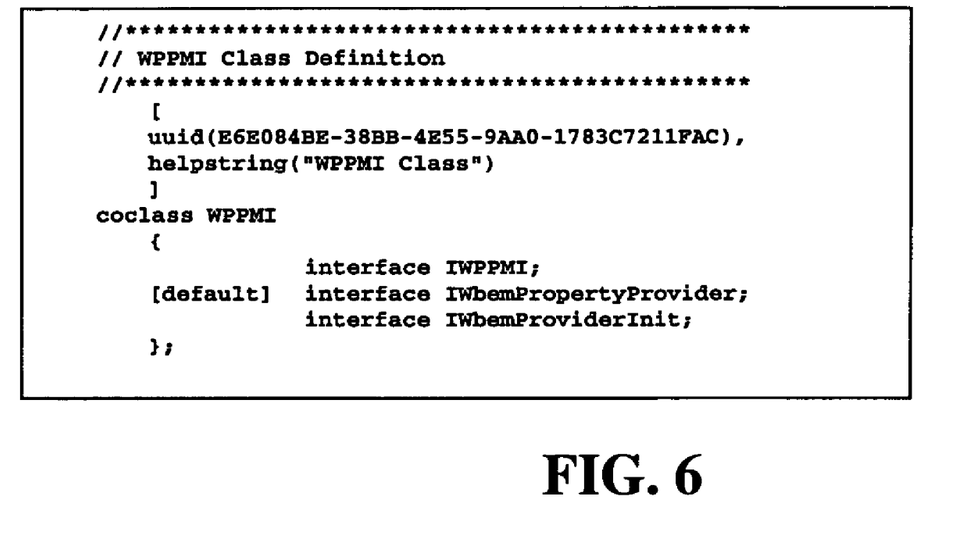
FIG. 6 illustrates a class definition used in connection with a preferred embodiment of the present invention.

FIG. 6 illustrates an MIDL definition of the COM class, that instantiates the WMI-MIPP object. As can be seen in the definition, the WMI-MIPP object implements all three interfaces described in FIGS. 3, 4, and 5.

Figure 7:
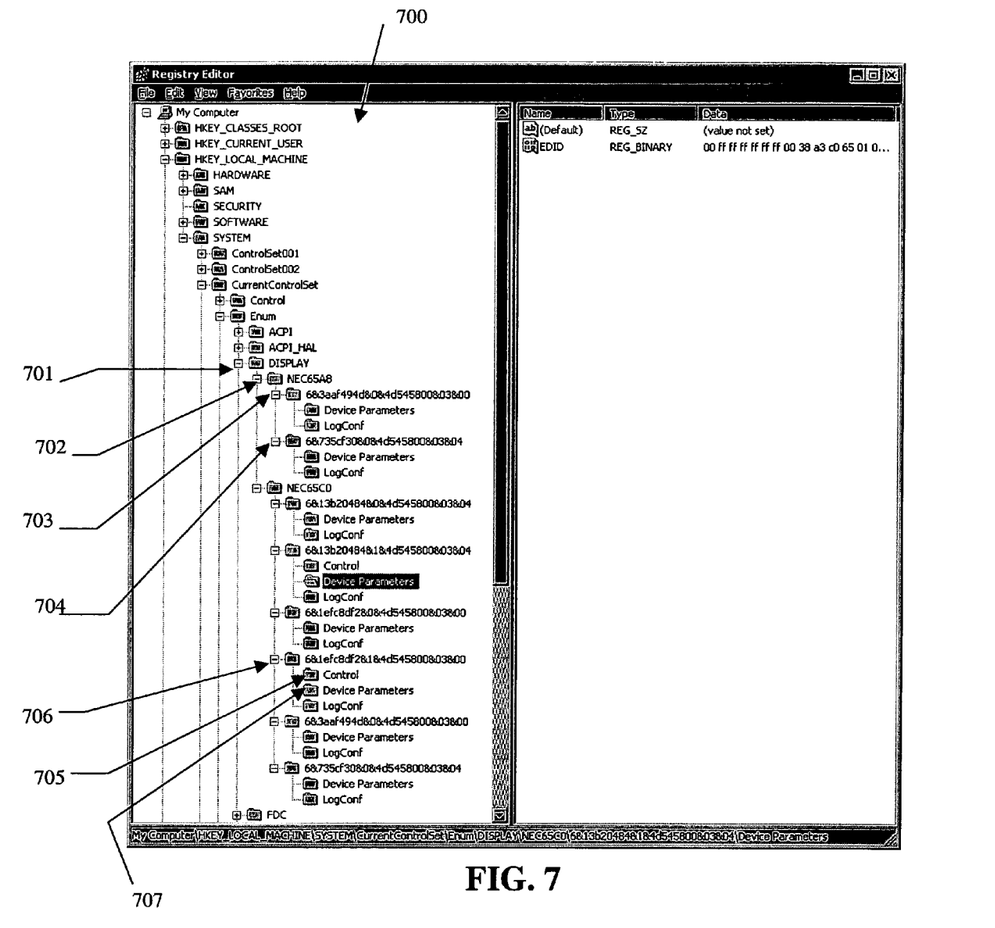
FIG. 7 is a representation of an exemplary registry used in connection with a preferred embodiment of the present invention.
Figure 8:
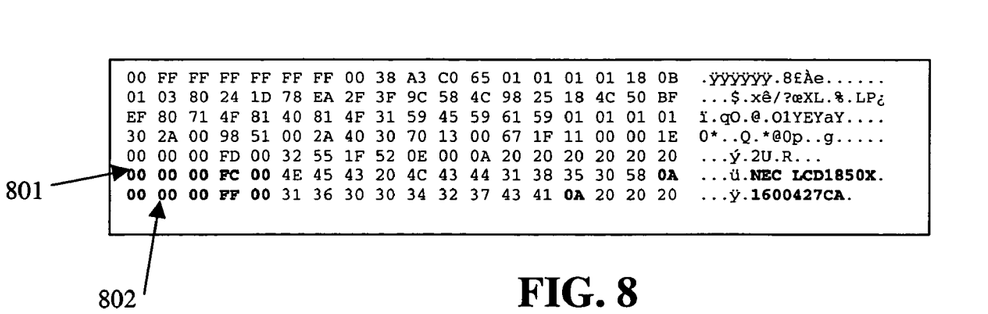
FIG. 8 illustrates an exemplary extended data identification block used in connection with a preferred embodiment of the present invention.

FIG. 7 illustrates the Windows registry path 700 to the monitor plug-and-play Extended Data Identification (EDID) block, which, in addition to other information, contains monitor serial number and model information. FIG. 8 illustrates an exemplary structure of the EDID block. The EDID data block consists of 1 or more 18-byte rows. Each row has a 5-byte descriptor and 13-byte data extent. In this example, the serial number data extent is identified by the "00 00 00 FF 00" descriptor 801 (hexadecimal representation); and the monitor model data extent is identified by the "00 00 00 FF 00" descriptor 802. If the string-type data in the data extent is shorter then 13 characters, it is terminated by the ASCII "line feed" code "0A" (hexadecimal representation).

Figure 9:
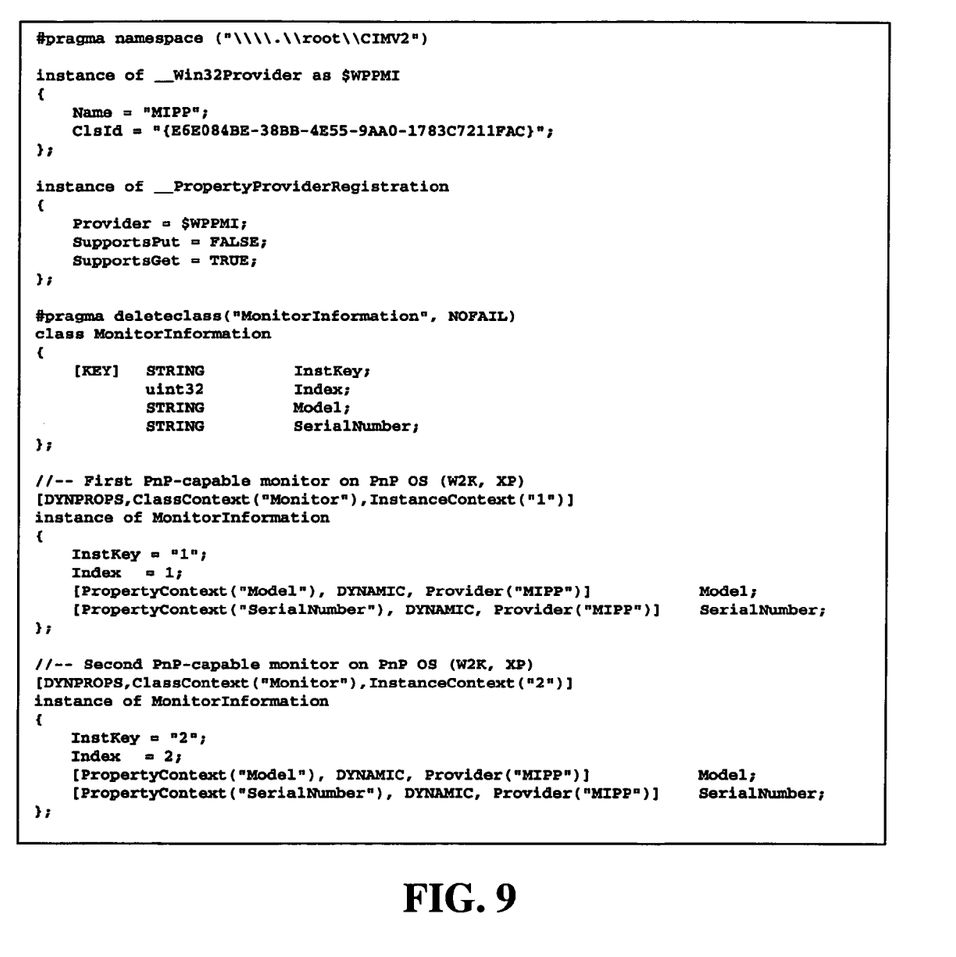
FIG. 9 shows an exemplary MOF script used in connection with a preferred embodiment of the present invention.

With reference to FIG. 9, to make a WMI provider available to CIMOM 103, the provider must be identified to CIMOM and associated with either some existing or a new Management Object class in the CIM Repository. Both of these functions are performed by the MOF compiler, which processes required directives represented in the MOF format. The MOF script represented in FIG. 9 defines the new MonitorInformation class; introduces the new WMI-MIPP and associates it with the COM class (defined in FIG. 6); and associates properties exposed by this provider with the instances of the MonitorInformation class. In the exemplary script shown in FIG. 9, only two instances of the MonitorInformation class are defined. This is sufficient for the systems with up to two monitors attached. For systems with more than two monitors, the sample script will need to be extended to define the required number of instances.

A preferred implementation of the WMI-MIPP is described in detail, as follows. WMI providers are COM objects exposing WMI-specific interfaces. FIGS. 2, 3 and 4, detail the COM interfaces that WMI-MIPP implements to become a WMI Property Provider. To make WMI-MIPP accessible both from within the WMI management framework (as a WMI property provider), as well as directly using standard COM Automation containers (like Visual Basic, Excel, etc), the WMI-MIPP object implements the additional interface, detailed in FIG. 5, which is derived from the IDispatch COM interface. This makes WMI-MIPP compatible with the COM Automation containers.

When the WMI provider is loaded by the WMI management infrastructure 101, of FIG. 1, the infrastructure invokes the IWbemProviderInit::Initialize method (see FIG. 4) to give the provider an opportunity to initialize its internal data structures. The WMI-MIPP's implementation of the IWbemProviderInit::Initialize method scans the Windows Registry (i.e., a hierarchical representation of the hardware and software on a computer) and builds an ordered set of model—serial number pairs for all active monitors attached to the system.

In doing so, the initialization routine starts by enumerating all the sub-keys under the HKLM\System\CurrentControlSet\Enum\Display registry key 701 of FIG. 7. Every sub-key there represents a class of monitors that were at least at some time connected to the system. Under each monitor class sub-key, e.g., sub-key 702, there is a list of sub-keys, e.g., sub-keys 703 and 704, corresponding to the instances of individual monitors of this class that were at least at some time connected to the system. The monitors currently connected to the system are identified by the presence of the control sub-key 705 under the corresponding monitor instance sub-key 706.

Referring still to FIG. 7, when the WMI-MIPP initialization routine, during its scan of the registry sub-tree, identifies a currently active instance of the monitor sub-key, it continues with the analysis of the device parameters sub-key 707, specifically looking for the EDID value. The EDID value, if present, represents an EDID data block (see FIG. 8)—the initialization routine parses the block and retrieves the monitor model and serial number, which are added to the ordered list of discovered monitor model and serial number combinations.

When the registry scan is completed, and an ordered list of monitor models and serial numbers is built, the initialization routine sets the flag indicating that initialization is completed and subsequent calls to initialization routine should be ignored.

After the initialization is completed, the provider is ready to serve the requests. The possible requests are the GetProperty and PutProperty method calls as defined by the IWBEMPropertyProvider interface (see FIG. 3). The IWBEMPropertyProvider::Get-Property method is invoked on the WMI-MIPP when the WMI management infrastructure 101, of FIG. 1, tries to obtain properties of the attached monitors.

Among others, the framework supplies three important parameters to the IWBEMPropertyProvider::Get-Property method implementation, which are the Class Mapping, Instance Mapping, and Property Mapping. For the WMI-MIPP, the first parameter should be "Monitor". The second parameter, Instance Mapping, should be a positive number identifying the required instance of the Monitor Information. For example, on a single-monitor system, the only meaningful value for the Instance Mapping parameter would be "1"; for a dual-head machine, the value for the Instance Mapping parameter would be "1" and "2". The third parameter, Property Mapping, should be either "Model" or "SerialNumber" depending on what property needs to be retrieved. If the value of one of the Class or Property Mapping is invalid, the WMI-MIPP returns WMI error code; if the value of the Instance Mapping exceeds the number of monitors on the system, the WMI-MIPP returns a "Not found" WMI warning.

As the monitor model and serial number are essentially read-only attributes, the IWBEMPropertyProvider::PutProperty method would not be implemented; thus, the PutProperty, when invoked, returns the standard WMI error message "Not implemented".

The details of the WMI-MIPP Registration MOF script are described as follows. The MOF script provided in connection with the present invention, illustrated in FIG. 9, makes the WMI-MIPP available to the WMI management infrastructure 101, of FIG. 1; defines the MonitorInformation CIM Managed Object; and associates attributes of this object with the properties exposed by the WMI-MIPP. To achieve these objectives, the script is compiled on the target computer system using the MS MOF compilation utility mofcomp.exe.

A detailed description of the MOF language can be found in Stemp, Greg, "WMI Helps Those Who Help Themselves", Feb. 11, 2004. The following provides a description of the clauses of the script pertinent specifically to WMI-MIPP. The first clause:

```
instance of __Win32Provider as $WPPMI
{
    Name = "MIPP";
    ClsId = "{E6E084BE-38BB-4E55-9AA0-1783C7211FAC}";
};
``` brings into the fold of WMI management infrastructure a COM object, identified by the value of the ClsId property, as a new WMI-Compatible provider. The ClsId value in this clause should match the uuid value in the definition of the MIPP COM class (see FIG. 6). The second clause:

```
instance of __PropertyProviderRegistration
{
    Provider = $WPPMI;
    SupportsPut = FALSE;
    SupportsGet = TRUE;
};
``` defines this new provider as a Property Provider. The third clause:

```
#pragma deleteclass ("MonitorInformation", NOFAIL)
class MonitorInformation
{
    [KEY]   STRING      InstKey;
            uint32  Index;
            STRING      Model;
            STRING      SerialNumber;
};
``` defines a new Management object, MonitorInformation class, to store monitor model and serial number information. The last two clauses define two instances of the MonitorInformation class and associate class attributes of this class with the properties exposed by the WMI-MIPP. The ClassContext, InstanceContext, and PropertyContext attributes provide values mapped by the infrastructure into the values of ClassMapping, InstanceMapping, and PropertyMapping parameters of the GetProperty call to MIPP provider.

As will be apparent to one skilled in the art, at least certain of the steps of the processes described herein can be performed by way of a computer readable storage medium having stored thereon computer executable instructions that, when executed on a computer, configure the computer to perform the processes described herein. While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

I claim:

1. A method, comprising:
    establishing a monitor class definition;
    creating a monitor information provider to identify at least one computer monitor;
    linking the monitor class definition and the monitor information provider;
    loading the monitor information provider on a computer in communication with the at least one computer monitor; and
    gathering, by the monitor information provider, serial number and model information of the at least one computer monitor,
    wherein the gathering step comprises parsing a plug-and-play extended data identification block on the computer and extracting the serial number and the model information from the plug-and-play extended data identification block, and
    wherein the monitor information provider is made available to a management infrastructure in accordance with a registration script.

2. The method of claim 1, wherein the registration script defines a monitor management object and associates properties of instances of the monitor management object with the monitor information provider.

3. A system, comprising:
    a computer monitor; and
    a computer in communication with the computer monitor, the computer configured to:
        establish a monitor class definition;
        create a monitor information provider to identify the computer monitor;
        link the monitor class definition and the monitor information provider;
        load the monitor information provider;
        gather, by the monitor information provider, serial number and model information of the at least one computer monitor;
        parse a plug-and-play extended data identification block; and
        extract the serial number and the model information from the plug-and-play extended data identification block,
    wherein the monitor information provider is made available to a management infrastructure in accordance with a registration script.

4. The system of claim 3, wherein the registration script defines a monitor management object and associates properties of instances of the monitor management object with the monitor information provider.

5. A computer program product including a computer readable storage medium having stored thereon computer executable instructions that, when executed on a computer, configure the computer to perform a method comprising the steps of:
    establishing a monitor class definition;
    creating a monitor information provider to identify at least one computer monitor;
    linking the monitor class definition and the monitor information provider;
    loading the monitor information provider on a computer in communication with the at least one computer monitor; and
    gathering, by the monitor information provider, serial number and model information of the at least one computer monitor,
    wherein the gathering step comprises parsing a plug-and-play extended data identification block on the computer and extracting the serial number and the model information from the plug-and-play extended data identification block, and
    wherein the monitor information provider is made available to a management infrastructure in accordance with a registration script.

6. The computer program product of claim 5, wherein the registration script defines a monitor management object and associates properties of instances of the monitor management object with the monitor information provider.

* * * * *